Feb. 25, 1930.   T. G. BAXENDEN ET AL   1,748,859
METAL SPOOL AND THE LIKE

Filed March 10, 1928

INVENTORS.
T. G. Baxenden
J. R. Collyear

Patented Feb. 25, 1930

1,748,859

UNITED STATES PATENT OFFICE

THOMAS GEORGE BAXENDEN, OF WATFORD, AND JOHN ROBERT COLLYEAR, OF BUSHEY, ENGLAND

METAL SPOOL AND THE LIKE

Application filed March 10, 1928, Serial No. 260,642, and in Great Britain October 19, 1927.

This invention relates to metal spools and similar articles where sheet metal end discs are fitted upon the ends of a cylindrical or tubular body part.

The invention has for its object to provide an improved construction of spool or similar article and method of making the same and the invention will be described as applied to metal spools used for photographic camera films to which the invention is particularly applicable.

The accompanying drawings show two constructions of spools embodying the present invention,—

Figure 1:
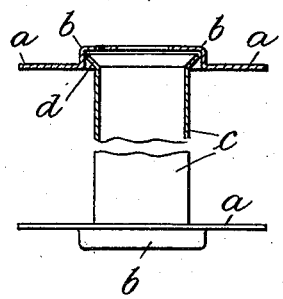
Fig. 1 is an elevation partly in section showing the end discs and body parts of a spool assembled for being fixed together.
Figure 2:
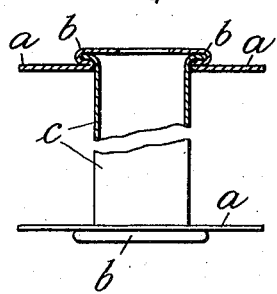
Fig. 2 is a similar view to Fig. 1 showing the parts after being fixed together.

In the construction of metal spool shown in Figs. 1 and 2, the end discs $a$ are each formed with a substantially cylindrical and somewhat shallow central recess or hollow boss $b$.

The cylindrical body part $c$ which may be rolled up from a sheet metal blank, is made of slightly smaller diameter than the recesses $b$ in the discs $a$ and the ends of the body part $c$ are flared out as at $d$ to make a good fit in the corresponding recesses.

The flared ends $d$ of the cylindrical body part are inserted in the recesses in the discs as shown in Fig. 1, and recesses in the discs are then pressed flat or substantially so whereby the side of each recess $b$ collapses or folds inwards on itself at the same time gripping the corresponding edges of the cylindrical body part between the folded parts as shown in Fig. 2.

Figure 3:
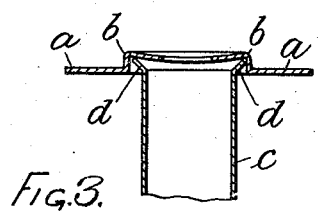
Figs. 3 and 4 are similar views to Figs. 1 and 2 showing a modification.
Figure 4:
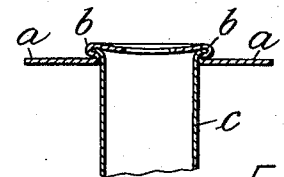

The recess or hollow boss $b$ may be dished inwardly or outwardly. Fig. 3 shows the flared end of the body $c$ inserted in the recess when dished inwardly and Fig. 4 the same parts when pressed together.

In the process of manufacture the cylindrical body part can be conveniently mounted in an enclosing support upon the surface of which the discs can rest so that the endwise pressure, or an endwise blow, applied will not distort the parts forming the finished article.

It will be seen that by forming the parts to be assembled as described, assembling the end of the cylindrical or tubular body in the recess, and subjecting the assembled parts to endwise pressure, or an endwise blow, a very rigid joint or connection is obtained and the process of manufacture is reduced to a minimum with a resulting reduction in the cost of manufacture.

We claim:—

1. The method of manufacturing a metal spool from a tubular metal body and metal end discs, which comprises flaring outwardly the ends of said body, providing hollow bosses, of a size and shape just to receive said flared ends, in said end discs, inserting said flared ends into the interiors of said bosses, respectively, and then subjecting the device to endwise pressure whereby said flared ends are bent further outwardly and the sides of said bosses are folded against opposite faces of said flared ends.

2. The method of fitting a metallic end disc to a tubular metallic body, which comprises pressing out a recess from said end disc, said recess being of larger size than the cross-section of said body, bending outwardly an end of said body so that said bent end can just take into said recess, inserting said bent end into said recess, and then subjecting the outside of said recess to pressure so as to cause said bent end to bend further outwardly and the wall of said recess to fold against opposite faces of said bent end.

THOMAS GEORGE BAXENDEN.
JOHN ROBERT COLLYEAR.